United States Patent
Koizumi et al.

(10) Patent No.: US 6,880,681 B2
(45) Date of Patent: Apr. 19, 2005

(54) BRAKE DRUM AND METHOD FOR PRODUCING THE SAME

(75) Inventors: Takashi Koizumi, Sayama (JP); Takaharu Echigo, Sayama (JP); Hiroto Shoji, Sayama (JP); Yasuhiro Nakao, Sayama (JP); Kunitoshi Sugaya, Sayama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/296,869

(22) PCT Filed: May 23, 2001

(86) PCT No.: PCT/JP01/04313

§ 371 (c)(1),
(2), (4) Date: Nov. 26, 2002

(87) PCT Pub. No.: WO01/92750

PCT Pub. Date: Dec. 6, 2001

(65) Prior Publication Data

US 2003/0159896 A1 Aug. 28, 2003

(30) Foreign Application Priority Data

May 29, 2000 (JP) ........................................ 2000-158692

(51) Int. Cl.$^7$ ............................................. F16D 65/10
(52) U.S. Cl. ............................... 188/218 R; 188/250 R; 164/98
(58) Field of Search ........................... 188/375, 251 A, 188/251 M, 218 R, 250 R; 164/98, 97, 111, 112, 103, 105, 91, 93

(56) References Cited

U.S. PATENT DOCUMENTS

| | | | | |
|---|---|---|---|---|
| 1,998,709 A | * | 4/1935 | Dake | 164/111 |
| 2,806,559 A | * | 9/1957 | Kerr | 188/218 R |
| 2,840,195 A | * | 6/1958 | Holton | 188/218 R |
| 3,005,259 A | * | 10/1961 | Benya et al. | 29/505 |
| 3,401,026 A | * | 9/1968 | Amala et al. | 428/612 |
| 4,008,517 A | * | 2/1977 | Schrader et al. | 29/527.6 |
| 4,266,638 A | * | 5/1981 | Petersen et al. | 188/218 R |
| 4,436,139 A | * | 3/1984 | Strader | 164/112 |
| 5,786,035 A | | 7/1998 | Nakao et al. | |
| 6,196,363 B1 | * | 3/2001 | Wall | 188/218 R |

FOREIGN PATENT DOCUMENTS

| | | |
|---|---|---|
| EP | 0 869 081 A | 5/1961 |
| EP | 0 879 975 A2 | 11/1998 |
| GB | 2 351 504 A | 1/2001 |
| JP | 11-336803 | 12/1999 |

* cited by examiner

Primary Examiner—Matthew C. Graham
Assistant Examiner—Mariano Sy
(74) Attorney, Agent, or Firm—Rankin, Hill, Porter & Clark LLP

(57) ABSTRACT

A brake drum includes a ring-shaped drum body (13), and a friction member (16) secured to the inner circumferential surface (18) of the drum body. Because the drum body is formed of a lightweight Al alloy and the friction member is formed of an Al-base composite material, the brake drum can be reduced in weight as a whole. Further, because the friction member, having projecting portions (17a) formed on its outer periphery (17), is cast-enveloped by molten metal of the Al alloy, the friction member and the drum body can be firmly fastened together. Thus, even when a great braking force is applied to the drum brake, the friction member can be prevented from being undesirably detached from the drum body.

6 Claims, 12 Drawing Sheets

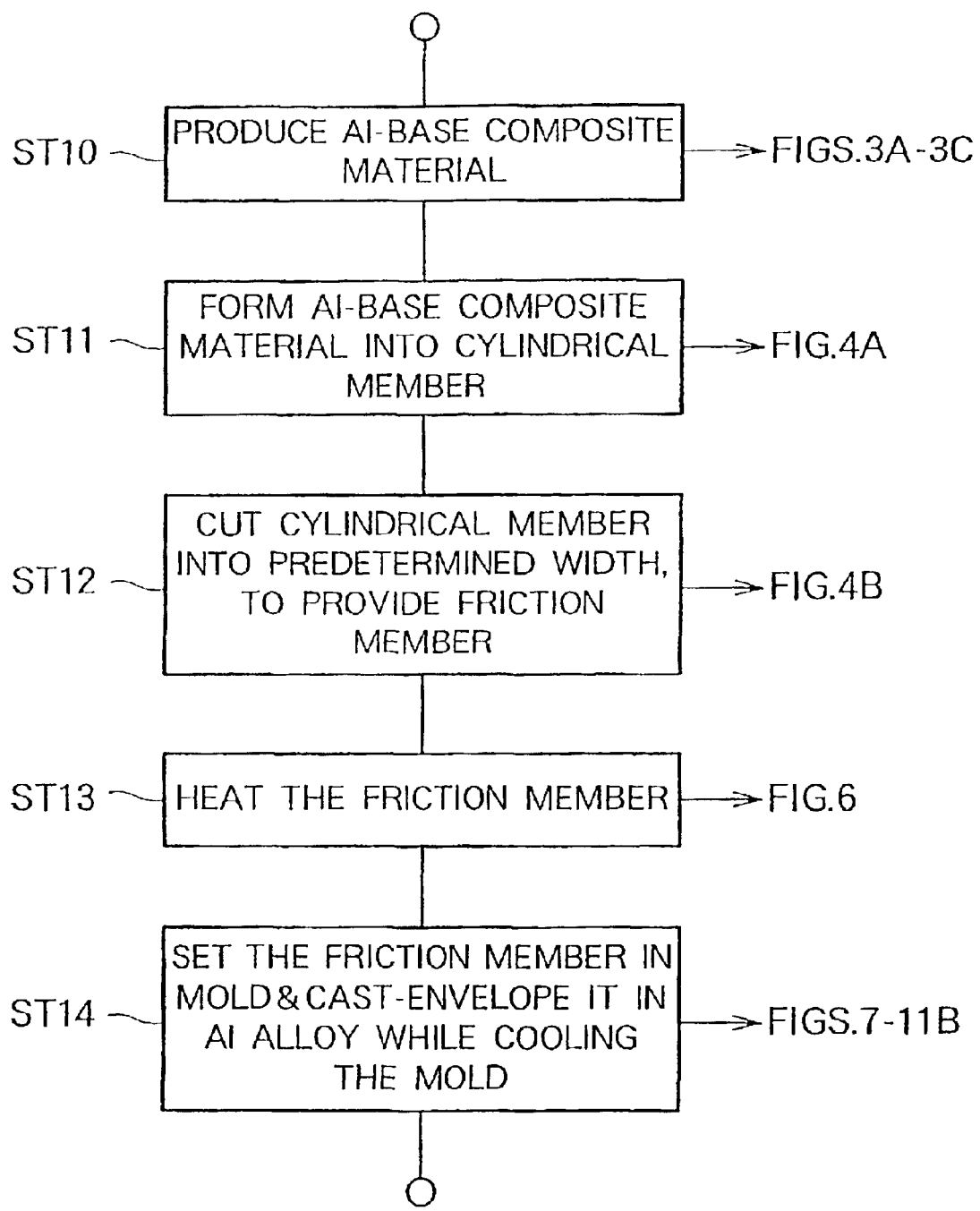

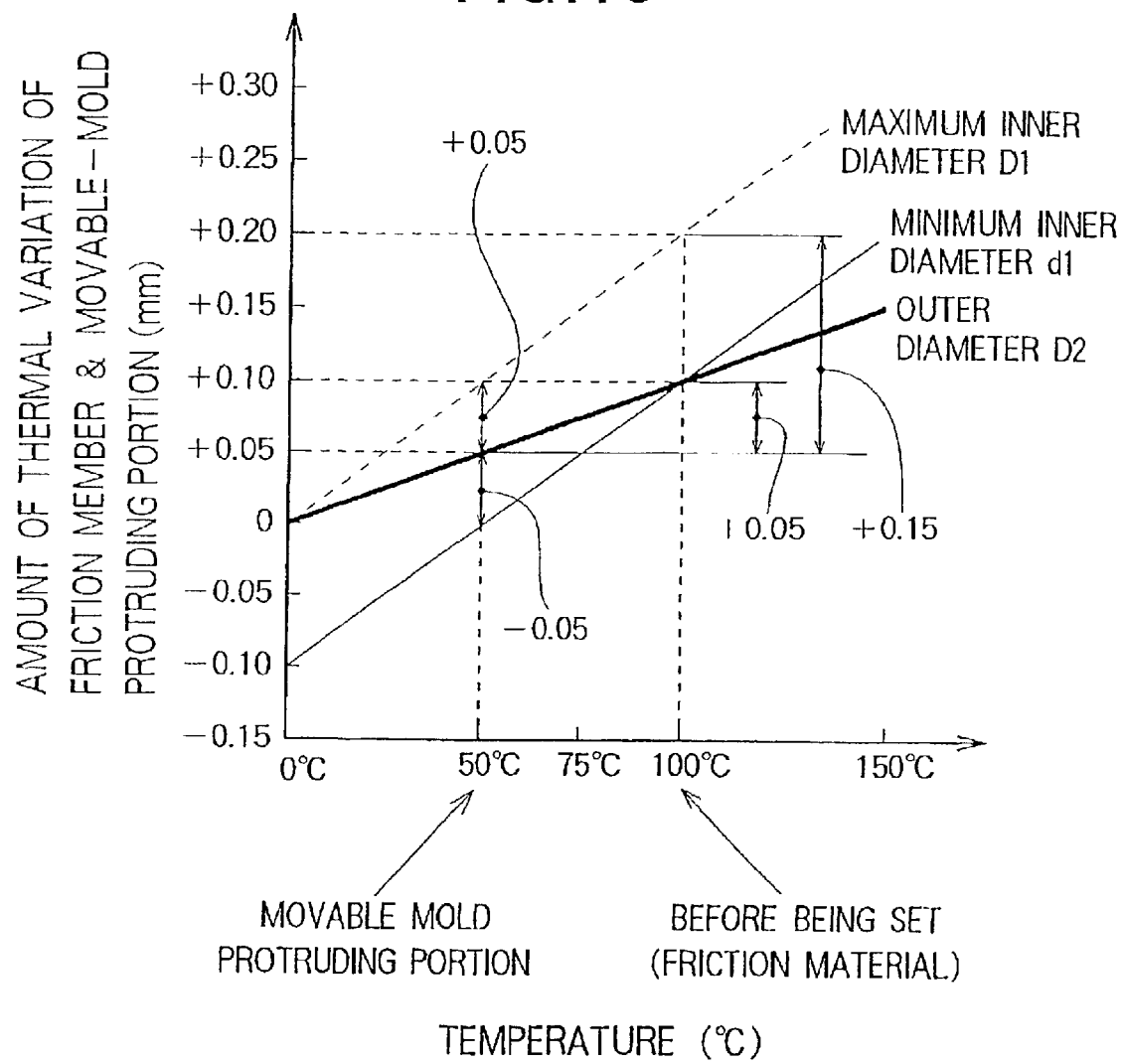

BRAKE DRUM AND METHOD FOR PRODUCING THE SAME

TECHNICAL FIELD

The present invention relates generally to brake drums for use in motorcycles or automobiles and methods for producing such brake drums, and more particularly to a brake-drum producing method in accordance with which a friction member of the brake drum is formed of an aluminum-base composite material and then the friction member is cast-enveloped by an aluminum alloy.

BACKGROUND ART

Some of the motorcycles or automobiles known today use a drum brake apparatus as their braking apparatus. In the drum brake apparatus, brake shoes are pressed against the inner circumferential surface (frictional surface) of a brake drum rotating with a vehicle wheel to thereby control the rotation of the brake drum.

In general, the traditional brake drums are formed integrally, or in one piece, of cast iron in order to retain a necessary strength of the frictional surface; however, the traditional cast-iron brake drums are heavy in weight and thus would hinder desired weight reduction of the motorcycles or automobiles to which the brake drums are applied.

Thus, in some of the more sophisticated drum brake apparatus, a lightweight material, such as an aluminum alloy (hereinafter "Al alloy"), is used in a part of the brake drum with a view to reducing the weight of the brake drum. Namely, the frictional surface of the brake drum, which needs to have high resistance to abrasion, is formed of cast iron, and the remaining part of the brake drum is formed of an Al alloy or other lightweight material, so that the motorcycles or automobiles equipped with such a brake drum can be considerably lighter in overall weight and thereby achieves lowered fuel consumption.

However, in the field of the motorcycles or automobiles, there is still a great need for further weight reduction to achieve lower fuel consumption, and depending on the type of the brake drum used, the weight of the brake drum has to be lowered further in order to more appropriately meet such a need.

DISCLOSURE OF THE INVENTION

It is therefore an object of the present invention to provide a lightweight brake drum and a method which can produce a lightweight brake drum with increased efficiency.

According to a first aspect of the present invention, there is provided a brake drum for use in a drum brake comprising: a cylindrical friction member with an outer periphery having a plurality of axial projecting portions formed at uniform intervals in a circumferential direction thereof; and an integrally formed drum body mounted on and around the outer periphery of said friction member, said friction member being formed of an aluminum-base composite material, said drum body being formed of an aluminum alloy, characterized in that each of the projecting portions has a projecting height in a range of 0.5–3.0 mm.

With the projecting and depressed portions formed on the outer periphery, the friction member can be fastened, with significantly increased strength, to the drum body, so that even when a great circumferential load acts on the friction member during a braking action of the drum brake, the friction member can be reliably prevented not only from being displaced relative to the drum body but also from being detached from the drum body.

Because the friction member is formed of an aluminum-base composite material and the drum body is formed of an aluminum alloy, a brake drum is provided which is very light in weight.

Each of the projecting portions of the friction member may have a projecting height in a range of 0.5–3.0 mm. Further, the pitch angle between the projecting portions may be set to be in a range of 6–45°, more preferably in a range of 6–30°.

According to a second aspect of the present invention, there is provided a method for producing a brake drum by fastening a friction member to an inner circumferential surface of a backup member formed of an Al alloy, which comprises: a step of providing an annular friction member formed of an Al-base composite material; a step of heating the friction member; a step of fitting the friction member, heated by the step of heating, on a protruding portion of one of mold members of a casting mold which has a lower temperature than the friction member; a step of forming a cavity by mating the one mold member with another mold member of the casting mold; and a step of charging molten metal of the Al alloy into the cavity while compulsorily cooling the heated friction member, to thereby cast-envelop the friction member by the alloy.

When the annular friction member is to be tightly fitted on the protruding portion of one of the mold members of the casting mold in the present invention, the temperature of the friction member is increased to be greater than the temperature of the above-mentioned mold's protruding portion, and then set in place relative to the mold's protruding portion. More specifically, where the friction member is formed of an Al-base composite material, the friction member has a greater coefficient of thermal linear expansion than the protruding portion of the one mold member. Thus, the inner diameter of the friction member becomes greater than the outer diameter of the mold's protruding portion, so that the friction member can be readily placed around the outer periphery of the mold's protruding portion and set in place relative to the mold's protruding portion. Further, before the molten metal of the Al alloy is charged or loaded into the casting mold, the friction member is compulsorily cooled down via the protruding portion of the one mold member. The compulsory cooling of the friction member induces a shrinkage of the friction member to minimize a possible clearance between the friction member and the mold's protruding portion and also limit a temperature increase of the friction member during the charging or loading of the molten metal of the Al alloy into the cavity. As a consequence, the thermal expansion of the friction member can be restricted appropriately, and it is possible to prevent the molten metal from being undesirably introduced to the inner circumference of the friction member.

The above-mentioned compulsory cooling of the heated friction member is performed by circulating a cooling liquid in the protruding portion of the one mold member. The cooling liquid may be cooling water. Thus, the facilities for cooling the friction member may be of a relatively simple construction, and therefore the necessary cost for the cooling facilities can be minimized.

The annular friction member of the Al-base composite material is produced by: a step of producing the Al-base composite material by causing a reinforcing material of metal nitride to contact magnesium nitride and causing the Al alloy to penetrate into the reinforcing material with at least part of the reinforcing material exposed as a metal part through reducing action of the magnesium nitride; and a step of forming, by extrusion, the Al-base composite material into a cylindrical member having projecting and depressed portions on an outer periphery thereof, an inner diameter of the cylindrical member constituting an inner diameter of the brake drum; and a step of cutting the cylindrical member into a width corresponding to the brake drum. The reinforcing material converted into the metal part by the reducing action of the magnesium nitride can improve the wettability with the molten metal of the Al alloy. The thus-improved wettability can strongly bind together the interface between—the opposed surfaces of—the reinforcing material oxide and the Al alloy, to thereby provide a billet of the Al-base composite material that has a superior extensibility. This Al-base composite material is extruded to produce the friction member. By being subjected to the extrusion process, the friction member can have superior tensile strength and proof stress and hence assure sufficient mechanical strength as a brake drum friction member. Further, the friction member formed of the Al-base composite material can be light in weight.

According to a third aspect of the present invention, there is provided a method for producing a brake drum by fastening a friction member to an inner circumferential surface of a backup member formed of an Al alloy, which comprises: a step of producing an Al-base composite material by causing a reinforcing material of metal nitride to contact magnesium nitride and causing the Al alloy to penetrate into the reinforcing material with at least part of the reinforcing material exposed as a metal part through reducing action of the magnesium nitride; and a step of forming, by extrusion, the Al-base composite material into a cylindrical member having projecting and depressed portions on an outer periphery thereof, an inner diameter of the cylindrical member constituting an inner diameter of the brake drum; a step of cutting the cylindrical member into a width corresponding to the width of the brake drum, to thereby provide the friction member; and a step of setting the friction member in a casting mold and cast-enveloping the set friction member by the Al alloy functioning as the backup member.

The reinforcing material converted into the metal part by the reducing action of the magnesium nitride can improve the wettability with the molten metal of the Al alloy. The improved wettability can strongly bind together the opposed surfaces of the reinforcing material oxide and the Al alloy, to thereby provide a billet of the Al-base composite material having a superior extensibility. This Al-base composite material is extruded to produce the friction member. By being subjected to the extrusion, the friction member can have superior tensile strength and proof stress and hence assure sufficient mechanical strength as a brake drum friction member. Further, the friction member formed of the Al-base composite material can be light in weight. Further, the Al alloy forming a matrix of the friction member can increase thermal conductivity of the friction member as compared to the conventional cast iron, and allows heat, produced by a braking action, to be readily dissipated, so that the friction member of the present invention can have an improved fade-resistant capability. Further, with the Al alloy forming the matrix, the friction member can have generally the same thermal linear expansion coefficient as the backup member, which will effectively prevent a difference in thermal expansion between the friction member and the backup member when the brake is activated.

The brake-drum producing method of the present invention further comprises a step of, after the provision of the friction member, heating the friction member above a temperature of the casting mold, and after the heated friction member is set in the casting mold, the friction member is cast-enveloped by the Al alloy. Because the friction member is formed of the Al-base composite material, the thermal linear expansion of the friction member becomes greater than the casting mold as the friction member is heated to a temperature that is predetermined degrees higher than that of the casting mold. Thus, the inner diameter of the friction member increases to allow the friction member to be set in the casting mold with great facility.

The extrusion of the Al-base composite material is performed with an extrusion ratio set to be in a range of 10 to 40, where the extrusion ratio is a value determined by dividing a cross-sectional area of the Al-base composite material before the extrusion by a cross-sectional area of the resultant extruded cylindrical member. If the extrusion ratio is set to 10 or lower, the tensile strength and proof stress of the cylindrical member (friction member) would decrease to the extent that the friction member can not retain the predetermined necessary strength as a brake drum friction member. Thus, in the present invention, the extrusion ratio is set to exceed 10, to assure the necessary strength of the friction member. With the extrusion ratio set above 40, however, the extruding force becomes so great that the extruding speed is lowered considerably. The thus-lowered extruding speed would deteriorate the cycle time performance and lead to increased production costs; thus, the upper limit of the extrusion ratio is set at 40 in the present invention.

BRIEF DESCRIPTION OF DRAWINGS

FIG. 2 is a flow chart showing a step sequence of a method for producing the brake drum in accordance with the present invention;

FIG. 10 is a graph showing thermal variation amounts of the friction member and the casting mold;

BEST MODE FOR CARRYING OUT THE INVENTION

Preferred embodiments of the present invention will be described in detail hereinbelow with reference to the accompanying drawings.

Figure 1:
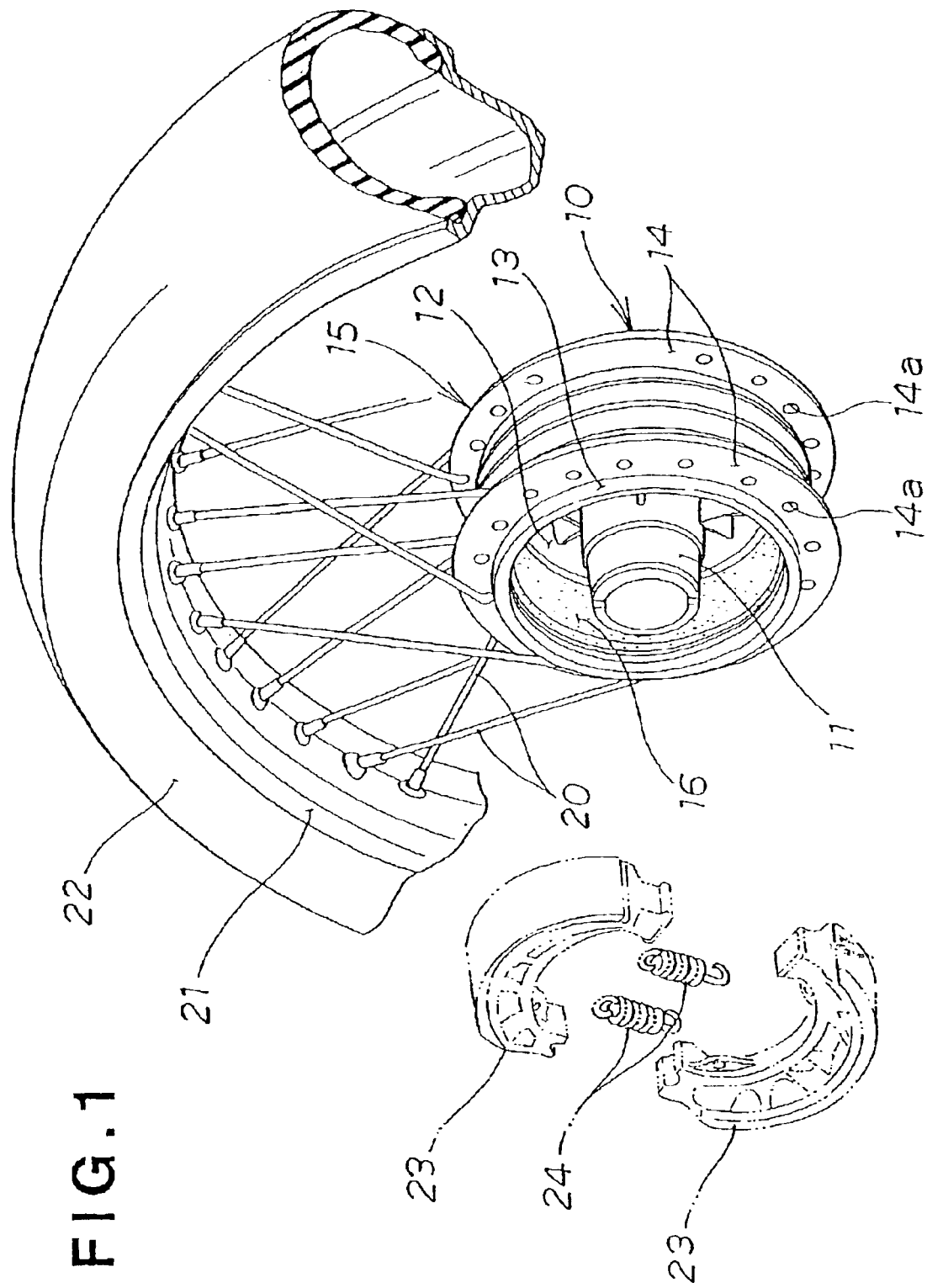
FIG. 1 is a perspective view showing a rear wheel of an motorcycle provided with a brake drum in accordance with the present invention.

In FIG. 1, there is shown a brake drum 10 in accordance with the present invention, which includes a boss 11 for mounting on a rear or front axle shaft, a flange 12 integrally formed at the right end of the boss 11, a drum body (i.e., backup member) 13 integrally formed on and around the outer periphery of the flange 12, and an annular friction member 16 secured to the inner circumferential surface of the drum body 13. A pair of opposed flanges 14 are secured to and around the outer periphery of the drum body 13.

The above-mentioned boss 11, flange 12, drum body 13 and pair of opposed flanges 14 are integrally formed by casting of an Al alloy, to thereby together constitute a one-piece hub 15. The hub 15 thus formed of the Al alloy can be significantly reduced in weight.

The friction member 16 is formed of an aluminum-base composite material (hereinafter simply called an "Al-base composite material"), which can also be significantly reduced in weight. Because the Al-base composite material contains a reinforcing substance, the friction member 16 can have sufficient resistance to abrasion as a brake drum friction member.

By thus forming the friction member 16 of the Al-base composite material, the matrix of the friction member 16 can be made of an Al alloy as with the drum body 13. Consequently, the thermal conductivity of the friction member 16 in the illustrated example can be increased as compared to that of the traditional cast iron, and heat produced by a braking action can be easily dissipated, so that the friction member 16 can have an increased fade-resistant capability.

In the above-described brake drum 10 of the invention, a plurality of mounting holes 14a are formed in each of the pair of opposed flanges 14. Rim 21 is fixed to the brake drum 10 with a plurality of spokes mounted in the individual mounting holes 14a, and a vehicle tire 22 is secured to the rim 22. In the interior space of the brake drum 10, there are accommodated a pair of brake shoes 23 and a pair of tension springs 24.

The following paragraphs describe a method for producing the brake drum in accordance with a first embodiment of the present invention, with reference to a flow chart of FIG. 2.

Step (hereinbelow abbreviated "ST") 10: Produce the Al-base composite material.

ST 11: Form, by extrusion, the produced Al-base composite material into a cylindrical member that has a plurality of small projecting and depressed portions on its outer periphery and has the same inner diameter as that of the finished brake drum.

ST 12: Cut the formed cylindrical member into a width corresponding to the width of the finished brake drum, to thereby provide the friction member.

ST 13: Heat the thus-cut friction member up to a predetermined temperature using a casting mold.

ST 14: Set the heated friction member in the casting mold, and cast-envelop the set friction member by the Al alloy functioning as the backup member for the friction member, while cooling the casting mold.

Details of each of ST 10–ST 14 above are shown in FIGS. 3A–11 which will be described below.

Figure 3A:
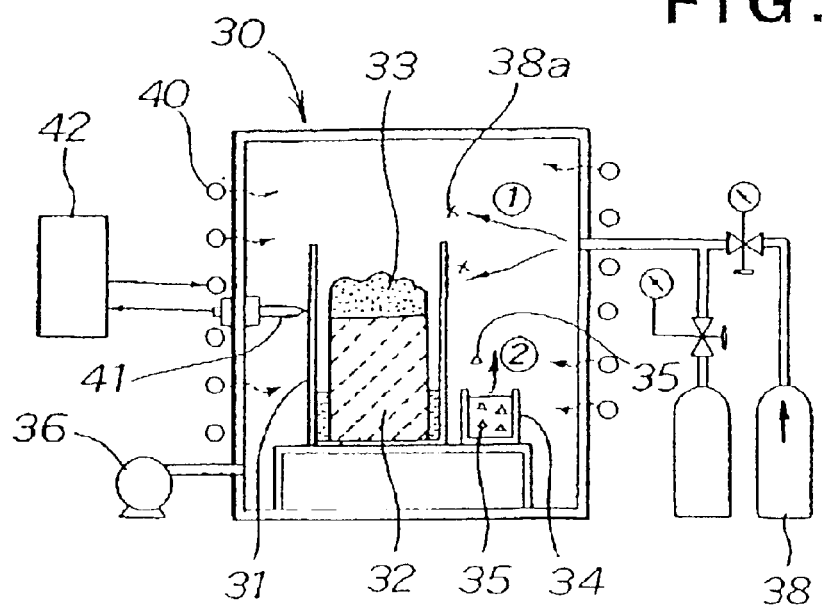
FIGS. 3A to 3C are detailed diagrams explanatory of a process for producing a billet of an Al-base composite material shown in FIG. 2.
Figure 3B:
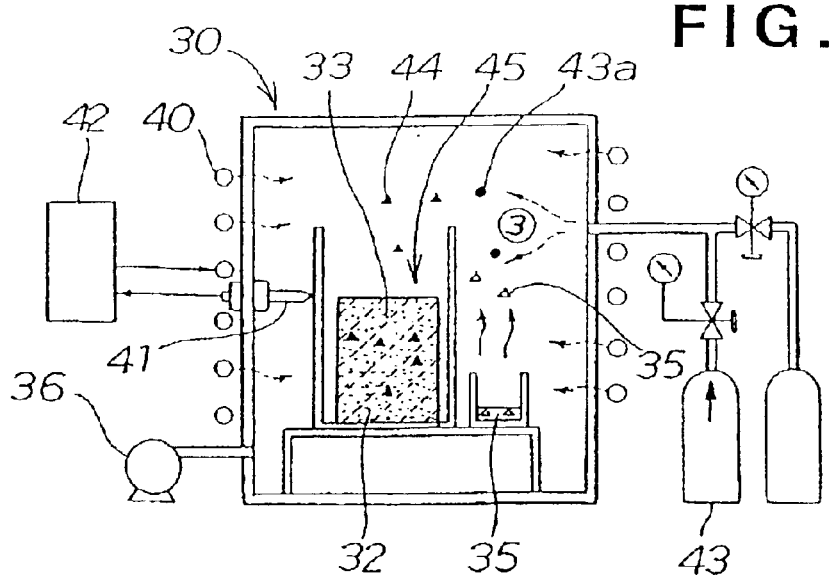
Figure 3C:
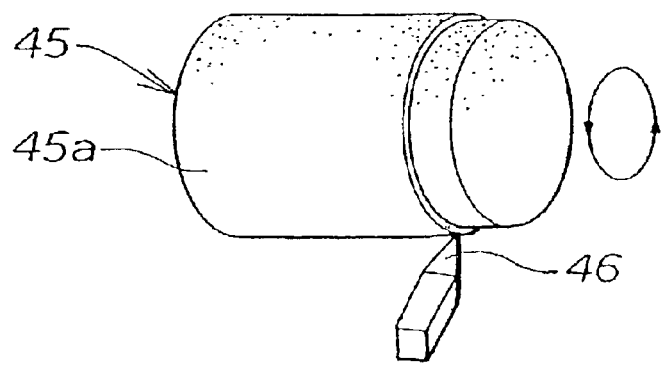

FIGS. 3A to 3C show a process for producing a billet of the Al-base composite material which is to be used for production of the brake drum, and this process corresponds to step 10 of FIG. 2.

First, in FIG. 3A, a reinforcing material in the form of a metal oxide (in the illustrated example, "alumina ($Al_2O_3$)") 32 is put into a first melting pot 31 within an atmosphere furnace 30. Specifically, the alumina 32 is a porous molding in the form of an oxide-based ceramic and have been preformed into a billet-like shape.

Al alloy 33 is placed on the alumina 32. Further, magnesium (Mg) 35 is put into a second melting pot 34 within the same atmosphere furnace 30. For example, the Al alloy 33 may be the JIS-A6061 alloy, and the magnesium 35 may be a Mg alloy.

After that, to remove air within the atmosphere furnace 30, the furnace 30 is evacuated by means of a vacuum pump 36, and then the vacuum pump 36 is deactivated when a predetermined vacuum level is attained in the atmosphere furnace 30. Thereafter, argon gas (Ar) is supplied from an argon gas cylinder into the atmosphere furnace 30 as denoted by arrow ①. Once the interior of the atmosphere furnace 30 is thus turned into an atmosphere of the argon gas 38a, the Al alloy 33 and magnesium 35 can be prevented from being oxidized.

Simultaneously, the atmosphere furnace 30 is heated via a heating coil 40 so that the alumina 32, Al alloy 33 and magnesium 35 are together heated to a predetermined temperature (e.g., about 750° C.–about 900° C.). Thus, the Al alloy 33 melts, and the magnesium 35 vaporizes as denoted by arrow ②. At this point, the current temperature in the atmosphere furnace 30 is detected by a temperature sensor 41, and on the basis of a resultant detection signal output from the temperature sensor 41, the temperature in the atmosphere furnace 30 is adjusted via a control section 42 to a particular set value.

Next, nitrogen gas ($N_2$) 43a is supplied from a nitrogen gas cylinder 43 into the atmosphere furnace 30 as denoted by arrow ③ in FIG. 3B. At the same time, pressure (e.g., the atmospheric pressure plus 0.5 kg/cm$^2$) is applied to the interior of the atmosphere furnace 30, so as to substitute the nitrogen gas 43a for the atmosphere in the atmosphere furnace 30. once the interior of the atmosphere furnace 30 has turned into the atmosphere of the nitrogen gas 43a, the nitrogen gas 43a reacts with the magnesium 35 to form magnesium nitride ($Mg_3N_2$) 44. Because the magnesium nitride 44 has a reducing function, it acts to change at least a part of the alumina 32 into a metal (aluminum). Thus, at least the part of the alumina 32 is exposed as a metal part in the atmosphere furnace 30. Thus producing the aluminum can improve the wettability.

Then, molten metal of the Al alloy 33 is caused to penetrate into the aluminum converted from the alumina 32 and the Al alloy 33 having thus penetrated in the aluminum is solidified, to thereby produce a billet of Al-base composite material 45.

The Al-base composite material billet 45 can have a good extensibility, by at least partly converting the alumina 32 into a metal form through the reducing action of the magnesium nitride and thereby improving the wettability.

Consequently, the Al-base composite material billet 45 can have a superior formability and can be readily deformed plastically.

Note that the penetration of the molten Al alloy 33 can be expedited if the atmosphere in the atmosphere furnace 30 is pressurized, in which case the desired Al-base composite material billet 45 can be obtained in a shorter time. Alternatively, the pressure in the atmosphere furnace 30 may be lowered via the vacuum pump 36, in which case too the penetration of the molten Al alloy 33 can be expedited under the pressure-reduced nitrogen atmosphere.

Further, the porous alumina molding 32 may have the Mg-containing Al alloy previously contained therein, and then the alumina 32 may be reduced by the magnesium nitride.

Furthermore, the process for producing the composite material billet 45 may be performed by placing the Al alloy on a porous molding of alumina particles containing magnesium powder.

In FIG. 3C, the outer periphery 45a of the Al-base composite material billet 45 is shaved by a cutting blade 46; that is, a so-called "peeling operation" is performed on the outer periphery 45a of the billet 45. By this shaving or peeling operation, the Al-base composite material billet 45 is formed into a shape suitable for extrusion at a later step. Because this Al-base composite material billet 45 has been integrated by surface or interfacial action with the reinforcing material, it has a very good thermal conductivity and presents a superior heat dissipating capability as compared to the conventional Al-base composite material billet. Therefore, the heat dissipating capability of the friction member 16 can be significantly enhanced. Further, because the Al-base composite material billet 45 has a superior formability and can be readily deformed plastically as previously noted, it can be formed into a desired shape by extrusion as shown in FIG. 4A.

Figure 4A:
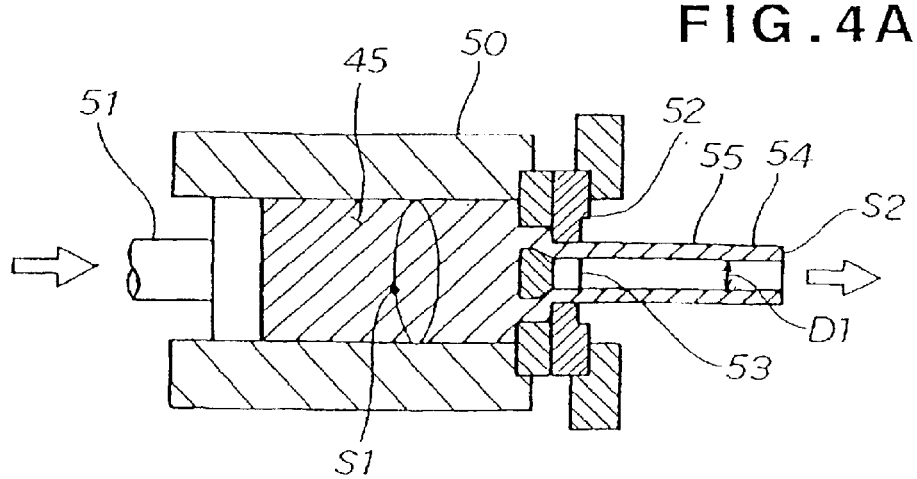
FIGS. 4A and 4B are detailed diagrams explanatory of a process for producing a friction member having projecting and depressed portions on its outer periphery after a cylindrical member is produced from the billet of the Al-base composite material.
Figure 4B:
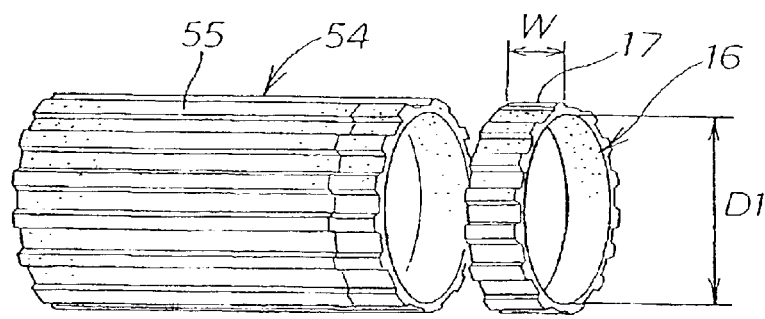

The illustrated example of FIG. 4A corresponds to step 11 in the flow chart of FIG. 2, while the illustrated example of FIG. 4B corresponds to step 12.

In FIG. 4A, the Al-base composite material billet 45 is first inserted into a container 50 and then pressed at one end by a ram 51, so that the composite material billet 45 is extruded through a gap between a die 52 and a mandrel 53. Thus extruding the Al-base composite material billet 45 forms a cylindrical member 54 having projecting and depressed portions (FIG. 4B) on its outer periphery and having an inner diameter D1 that will constitute the inner diameter of the brake drum 10 (see FIG. 1).

It has been commonly said that the conventional Al-base composite material billet is difficult to extrude into a desired shape due to its poor extensibility and poor plastic deformability. Thus, the Al-base composite material billet 45 employed in the present invention has a chemically-improved wettability between the metal oxide and the molten metal of the Al alloy by use of the magnesium nitride. This can strongly bind together the surfaces of the metal oxide and the Al alloy through chemical action, to achieve a strengthened interfacial state between the two. Consequently, the Al-base composite material billet 45 employed in the present invention presents a superior extensibility as compared to the conventional Al-base composite material, and can be formed into any desired shape by extrusion.

Because of the superior extensibility, the columnar billet of the Al-base composite material 45 can be properly extruded into the cylindrical member (so-called "hollow-die-based manufacturing method").

The cylindrical member 54 is used as the friction member 16 of FIG. 1, and it is desirable that the cylindrical member 54 secure tensile strength and proof stress at predetermined values in order to keep the necessary strength of the friction member 16. To this end, the instant embodiment is arranged to set an extrusion ratio R to a range of 10–40, where the extrusion ratio R is a value determined by dividing a cross-sectional area S1 of the Al-base composite material billet 45 before the extrusion by a cross-sectional area S2 of the extruded cylindrical member 54. By variously modifying the extrusion ratio R of the Al-base composite material billet 45 within the range of 10–40, the cylindrical member 54 can have high quality with no internal defects, and thus a need for complicated quality managing steps can be eliminated by the instant embodiment. The reasons why the extrusion ratio R is set to the range of 10–40 in the instant embodiment will be later set forth in detail in relation to FIG. 5.

The extruded cylindrical member 54 is then cut into the width W corresponding to that of the brake drum 10 (FIG. 1), as illustrated in FIG. 4B. The thus-cut cylindrical member 54 constitutes the friction member 16 of the brake drum shown in FIG. 1. Because the tensile strength and proof stress is secured at predetermined values as noted above, the friction member 16 can keep the necessary strength as the brake drum friction member.

With the projecting and depressed portions formed on its outer periphery 17, the friction member 16 can be secured to the brake drum 10 (FIG. 1) reliably. Because the projecting and depressed portions on the outer periphery 17 of the friction member 16 can be formed simultaneously during the extrusion process, the yields can be improved. As a consequence, the cost can be significantly reduced as compared to the case where the projecting and depressed portions are formed by a cutting process. The projecting and depressed portions on the friction member 16 will be later described in greater detail in relation to FIGS. 13 to 14B.

Figure 5:
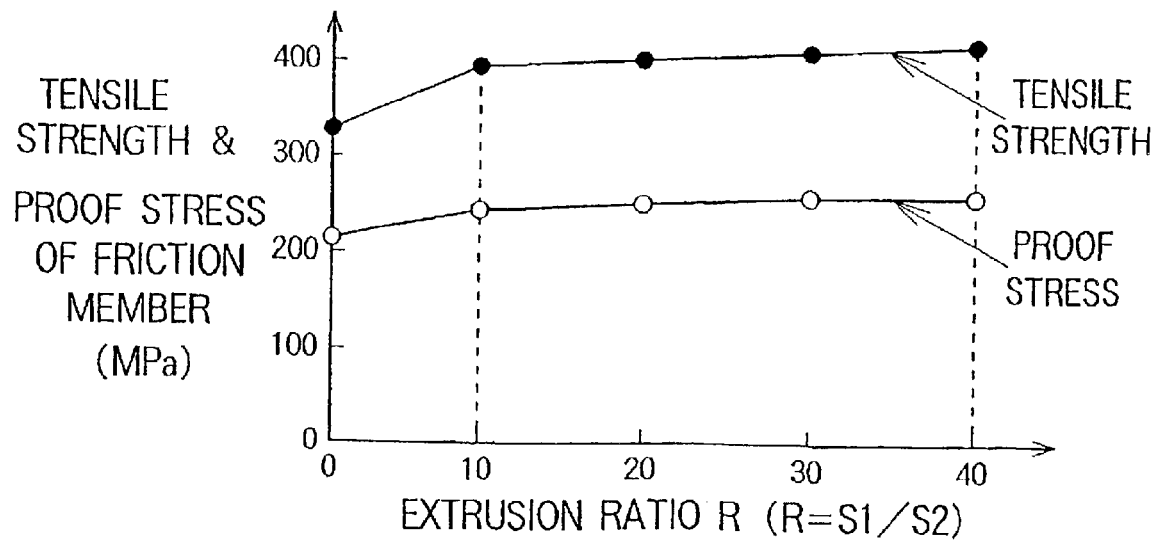
FIG. 5 is a graph showing relationship between a extrusion ratio for extruding the Al-base composite material as shown in FIG. 4A and tensile strength and proof stress in production of a ring-shaped friction member.

FIG. 5 is a graph showing relationship between the extrusion ratio and the tensile strength and proof stress in the production of the inventive brake drum. More specifically, in FIG. 5, the horizontal axis represents the extrusion ratio R, while the vertical axis represents the tensile strength (MPa) and proof stress (MPa) of the cylindrical member 54 (i.e. friction member 16). Here, the proof stress represents a level of stress necessary for producing a 0.2% permanent set or strain.

If the extrusion ratio R is set to 10 or lower, the tensile strength of the friction member 16 decreases below a predetermined value (about 380 MPa) and the proof stress also decreases below a predetermined value (about 240 MPa). Therefore, in this case, the friction member 16 can not retain a predetermined strength. Further, with the extrusion ratio R set to 10 or lower like this, casting defects, such as shrinkage cavities, caused during the production of the Al-base composite material billet would undesirably remain, which is likely to cause unwanted blow holes after the extrusion.

If, on the other hand, the extrusion ratio R is set to be greater than 10, the tensile strength of the friction member 16 increases above the predetermined value (about 380 MPa) and the proof stress also increases above the predetermined value (about 240 MPa). Therefore, in this case, the friction member 16 can retain the predetermined strength and secure sufficient interior quality. Thus, in the instant embodiment, the lower limit of the extrusion ratio R is set at 10 from a viewpoint of the mechanical characteristics of the Al-base composite material billet.

However, with the extrusion ratio R set above 40, the extruding force becomes so great that the extruding speed is lowered considerably. The thus-lowered extruding speed would deteriorate the cycle time performance and lead to increased production costs; thus, the upper limit of the extrusion ratio R is set at 40 in the instant embodiment.

Figure 6:
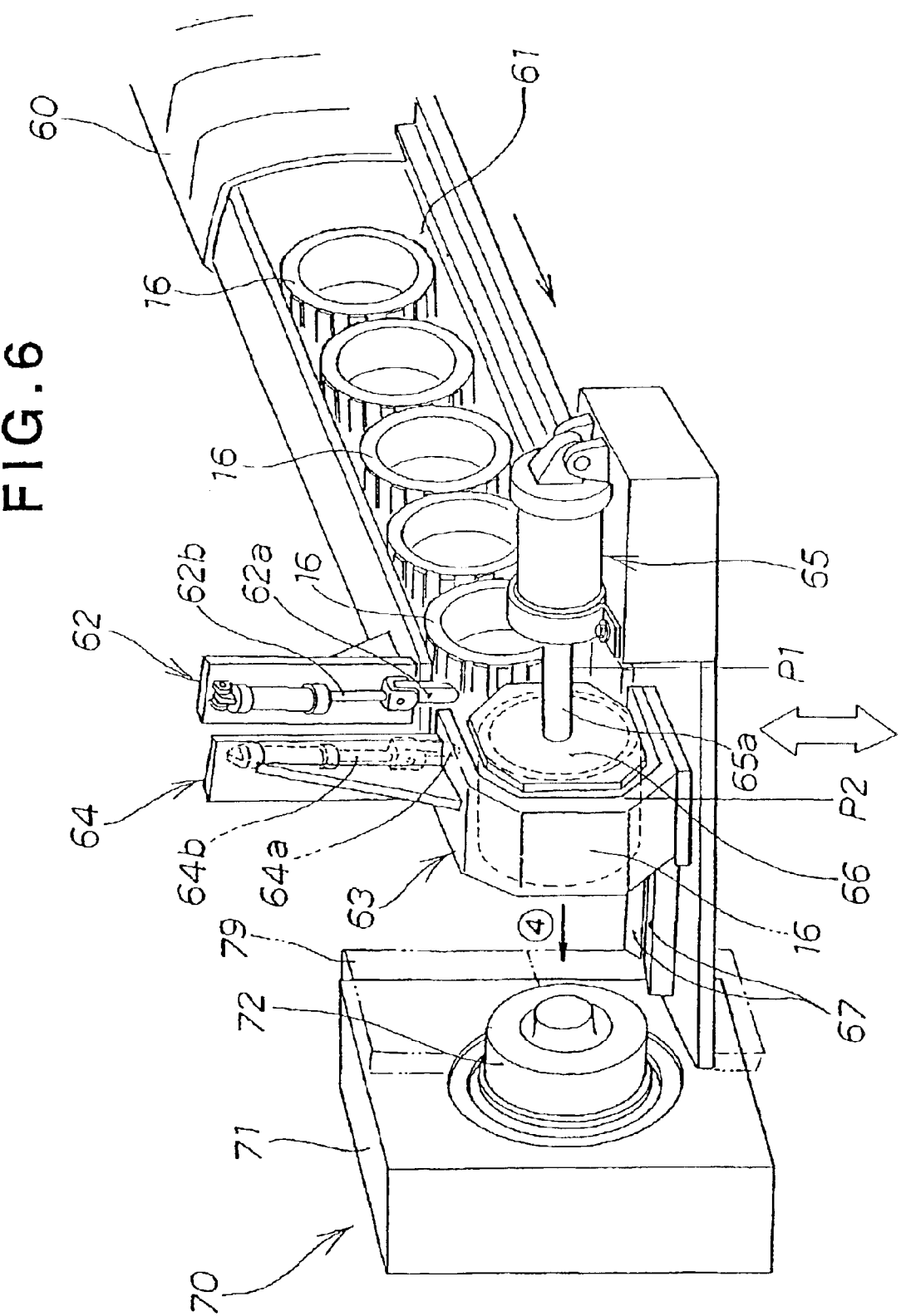
FIG. 6 is a perspective view showing how a heated friction member is set in a casting mold.

FIG. 6 is a perspective view of an apparatus for implementing the brake-drum producing method of the present invention, and the function of this brake-drum producing apparatus corresponds to step 13 in the flow chart of FIG. 2.

Here, the friction member 16 manufactured in the previous steps is heated via a heating furnace 60 up to a predetermined temperature (e.g., 100° C.), and the thus-heated friction member 16 is transferred via a transfer section 61 to a waiting position P1 as indicated by an arrow. The friction member 16 having arrived at the waiting position P1 is caused, via a stopper piece 62a of a first stopper section 62, to stop at a predetermined point of the waiting position P1.

To further move the friction member 16 to a fitting position P2 of a fitting section 63, a cylinder rod 62b of the first stopper section 62 is retracted to raise the stopper piece 62a, and simultaneously a cylinder rod 64b of a second stopper section 64 is retracted to raise a stopper piece 64a. In this condition, the friction member 16 being halted at the waiting position P1 is transferred to the fitting position P2 by activation of the transfer section 61. After the friction member 16 has thus been transferred to the fitting position P2, the respective cylinder rods 62b and 64b of the first and second stopper sections 62 and 64 are advanced to lower the respective stopper pieces 62a and 64a. Thus, the friction member 16 can be kept stationary at the fitting position P2.

After that, a cylinder rod 65a of a fitting cylinder 65 is advanced to push forward a plate 66 attached to the distal end of the cylinder rod 65a. Thus pushing forward the plate 66 causes the friction member 16 to move along rails 67 toward a protruding portion 72 of a movable mold member 71 (hereinafter "movable-mold protruding portion") as denoted by arrow ④. The movable mold member 71 is a part of a casting mold 70. The fitting section 63 is movable in a vertical direction away from the movable-mold protruding portion 72 so that it can be evacuated from the mold having the protruding portion 72 as appropriate.

Figure 7:
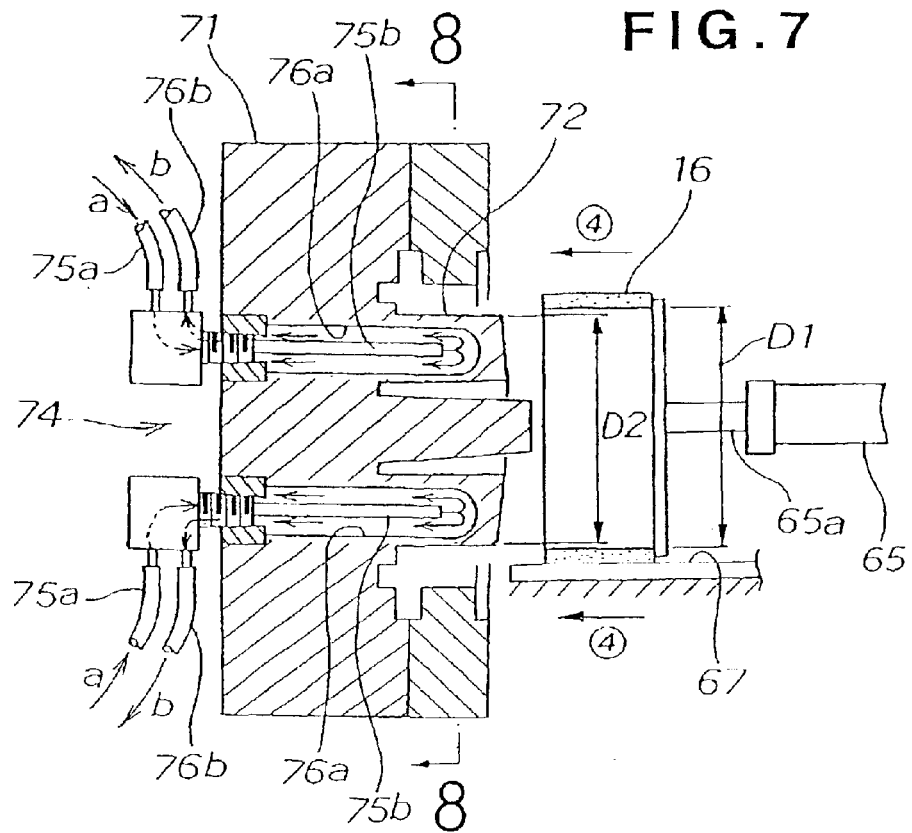
FIG. 7 is a view explanatory of how the ring-shaped friction member is fitted on a movable-mold's protruding portion of the casting mold.
Figure 8:
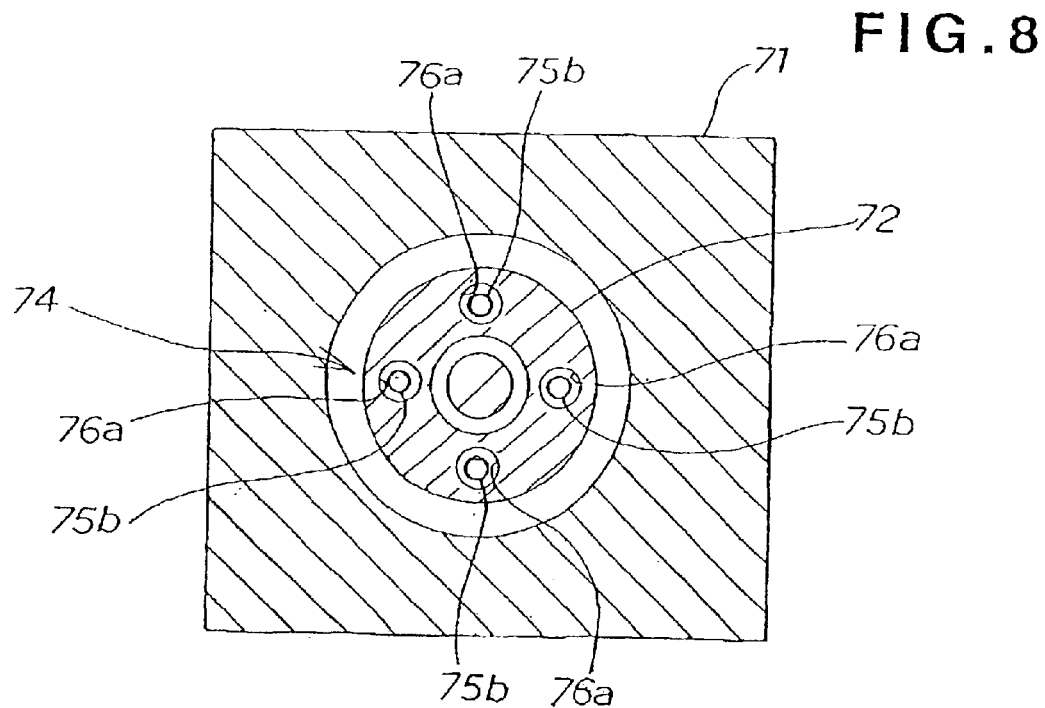
FIG. 8 is a sectional view taken along the 8-8 line of FIG. 7.

More specifically, as shown in FIGS. 7 and 8, the cylinder rod 65a of the fitting cylinder 65 is advanced to move the friction member 16 as denoted by arrow ④, so that the friction member 16 can be placed around and fitted on the movable-mold protruding portion 72. The movable-mold protruding portion 72 includes a cooling section 74 having a water supply hose 75a, via which cooling water is supplied to a copper pipe 75b as indicated by arrow a. The supplied cooling water flows, via the distal end of the copper pipe 75b, into a cooling water passage 76a of the protruding portion 72, turns back through the passage 76a as indicated by arrows, and then is discharged via a drain hose 76b as indicated by arrow b. In this way, the cooling water is circulated through the interior of the movable-mold protruding portion 72 to thereby cool the protruding portion 72 down to about 50° C. As a consequence, the movable-mold protruding portion 72 can be caused to shrink so that its outer diameter D2 becomes smaller.

Because the friction member 16 has been heated up to 100° C. as noted previously, the inner diameter D1 of the friction member 16 can be expanded to be sufficiently greater than the outer diameter D2 of the movable-mold protruding portion 72. In this way, the friction member 16 can be readily placed around and fitted on the outer periphery of the movable-mold protruding portion 72.

As illustrated in FIG. 8, the cooling section 74 includes four cooling water passages 76a provided at 90° intervals around the outer periphery of the movable-mold protruding portion 72, and the thus-arranged water passages 76a can effectively cool the outer periphery of the movable-mold protruding portion 72 down to the predetermined temperature (about 50° C.). However, the cooling section 74 may include more than four cooling water passages 76a; any number of the cooling water passages 76a may be chosen in correspondence with a desired cooling condition.

Figure 9:
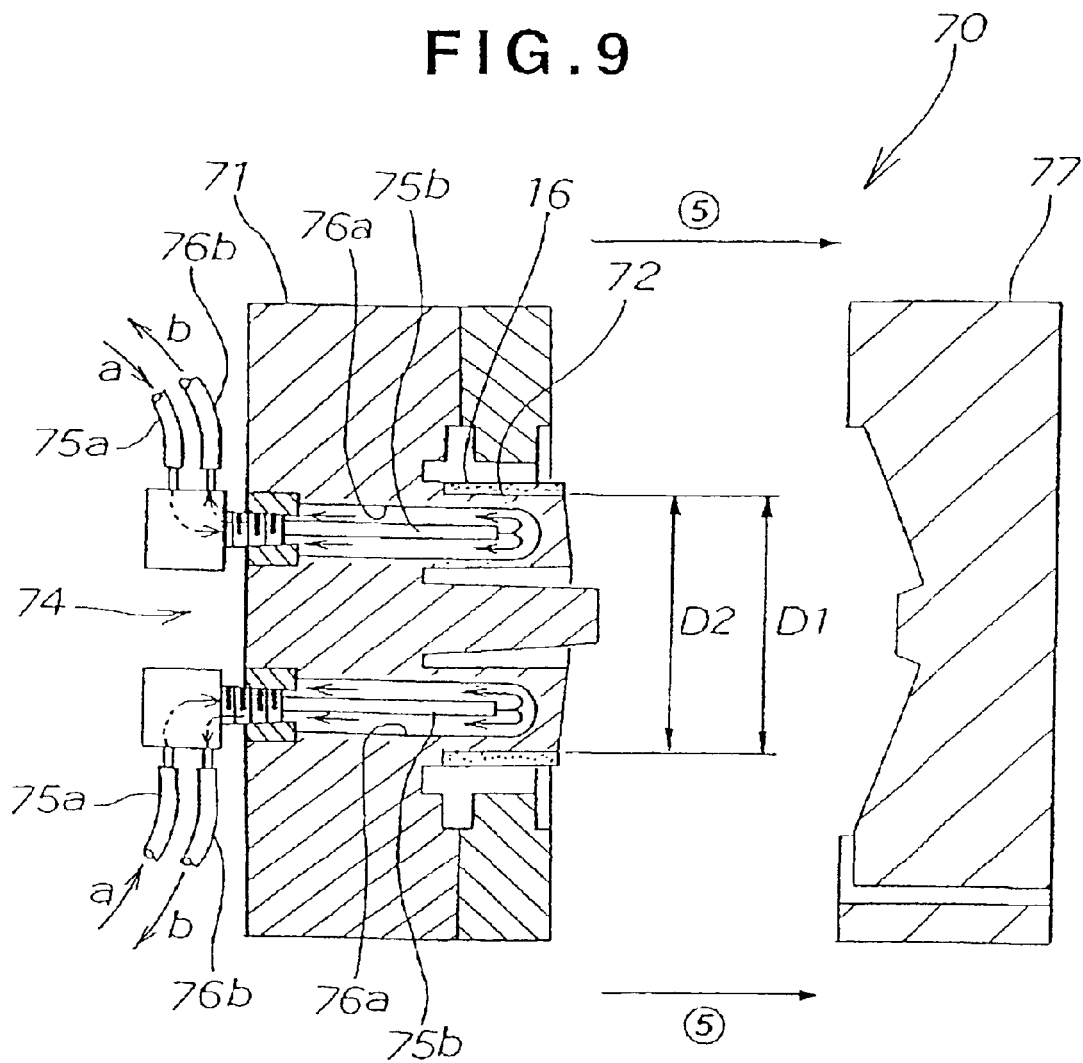
FIG. 9 is a sectional view showing the movable mold with the friction member set therein and a fixed mold member.

As illustrated in FIG. 9, the friction member 16 heated up to about 100° C. contacts the movable-mold protruding portion 72 of about 50° C. as the friction member 16 is fitted to the outer periphery of the protruding portion 72. Because the movable-mold protruding portion 72 is greater in thermal capacity than the friction member 16, the friction member 16 is cooled down to the same temperature as the movable-mold protruding portion 72 after the contact between the protruding portion 72 and the friction member 16. Thus, the temperature of the friction member 16 falls from 100° C. down to 50° C. and shrinks, so that the inner diameter D1 of the friction member 16 becomes smaller.

On the other hand, the temperature of the movable-mold protruding portion 72 is kept at 50° C. This way, the friction member 16 can be shrink-fit on the movable-mold protruding portion 72, so that the resultant intimate contact between the friction member 16 and the movable-mold protruding portion 72 can eliminate a possible clearance therebetween. After the friction member 16 is fitted on the movable-mold protruding portion 72 in the above-mentioned manner, the movable mold member 71 is moved toward a fixed mold member 77 as denoted by arrow ⑤ until the friction member 16 is properly set in the casting mold 70.

FIG. 10 is a graph showing thermal variation amounts of the friction member of the brake drum and the casting mold, where the horizontal axis represents the temperature and the vertical axis represents the clearance between the friction member 16 and the movable-mold protruding portion 72. Further, in this figure, a heavy solid line represents thermal expansion of the movable-mold protruding portion 72, and a light solid line represents thermal expansion of the friction member 16.

The inner diameter D1 of the friction member 16 is chosen in such a manner that the clearance between the friction member 16 and the movable-mold protruding portion 72 has a very small size (e.g., 0.05 mm or smaller) such that the later-described molten metal of the Al alloy is not introduced between the friction member 16 and the movable-mold protruding portion 72 when the temperatures of the friction member 16 and protruding portion 72 have equaled each other. Minimum value of the inner diameter D1 of the friction member 16 is denoted as d1 by the light solid line, and a maximum value of the inner diameter D1 of the friction member 16 is denoted as D1 by a dotted line.

As noted earlier, the friction member 16 is made of the Al-base composite material, while the casting mold 70 (movable-mold protruding portion 72) is made of alloy tool steel (JIS-G-4404-SKD).

Coefficient of thermal linear expansion of the movable-mold protruding portion 72 (SKD) is about $13.5 \times 10^{-6}/°$ C., and the outer diameter D2 of the movable-mold protruding portion 72 increases by +0.05 when the protruding portion 72 is heated from 0° C. up to 50° C. Further, the outer diameter D2 of the movable-mold protruding portion 72 increases by +0.075 when the protruding portion 72 is heated to 75° C. If the movable-mold protruding portion 72 is heated up to 100° C., the outer diameter D2 increases by +0.10. Because the movable-mold protruding portion 72 has a low thermal linear expansion coefficient, the outer diameter D2 increases relatively slowly.

On the other hand, the coefficient of thermal linear expansion of the friction member 16 (Al-base composite material billet) is about $20 \times 10^{-6}/°$ C. that is greater than that of the movable-mold protruding portion 72. Thus, the maximum inner diameter D1 of the friction member 16 increases by +0.10 if the friction member 16 is heated from 0° C. up to 50° C., and increases by +0.15 if the friction member 16 is heated up to 75° C. Further, the maximum inner diameter D1 of the friction member 16 increases by +0.20 if the friction member 16 is heated up to 100° C. Because the friction member 16 has a great thermal linear expansion coefficient, the inner diameter D1 increases rapidly.

The minimum inner diameter d1 of the friction member 16 increases rapidly in a similar manner to the maximum inner diameter D1.

Therefore, if the friction member 16 is heated up to 100° C. and the movable-mold protruding portion 72 is heated up to 50° C., a difference "maximum inner diameter D1–outer diameter D2" becomes +0.15, and a difference "minimum inner diameter d1–outer diameter D2" becomes +0.05. As a consequence, the friction member 16 permits a great clearance relative to the movable-mold protruding portion 72, which allows the friction member 16 to be placed over the outer periphery of the protruding portion 72 with facility.

After the friction member 16 is placed around the outer periphery of the movable-mold protruding portion 72, the friction member 16 is cooled down to the temperature of the protruding portion 72. During this period, the difference "maximum inner diameter D1–outer diameter D2" decreases from +0.15 to +0.05, and mathematically, the difference "minimum inner diameter d1–outer diameter D2" decreases from +0.05 to −0.05. Thus, the clearance of the friction member 16 relative to the movable-mold protruding portion 72 can be made smaller, or can be eliminated almost completely by the effect of the shrink fit.

Thus, the friction member 16 can be positioned coaxially with the movable-mold protruding portion 72 with no undesired displacement relative to the latter, and also it is possible to prevent the molten metal from being introduced to the inner circumference of the friction member 16 during charging of the molten metal.

Further, since the thermal linear expansion coefficient (about $20 \times 10^{-6}/°$ C.) of the friction member 16 is greater than the thermal linear expansion coefficient ($13.5 \times 10^{-6}/°$ C.) of the movable-mold protruding portion 72, the shrink-fit effect can be effectively provided without the friction member 16 having to be heated to a very high temperature. Accordingly, the cost of the heating furnace 60 can be lowered.

Figure 11A:
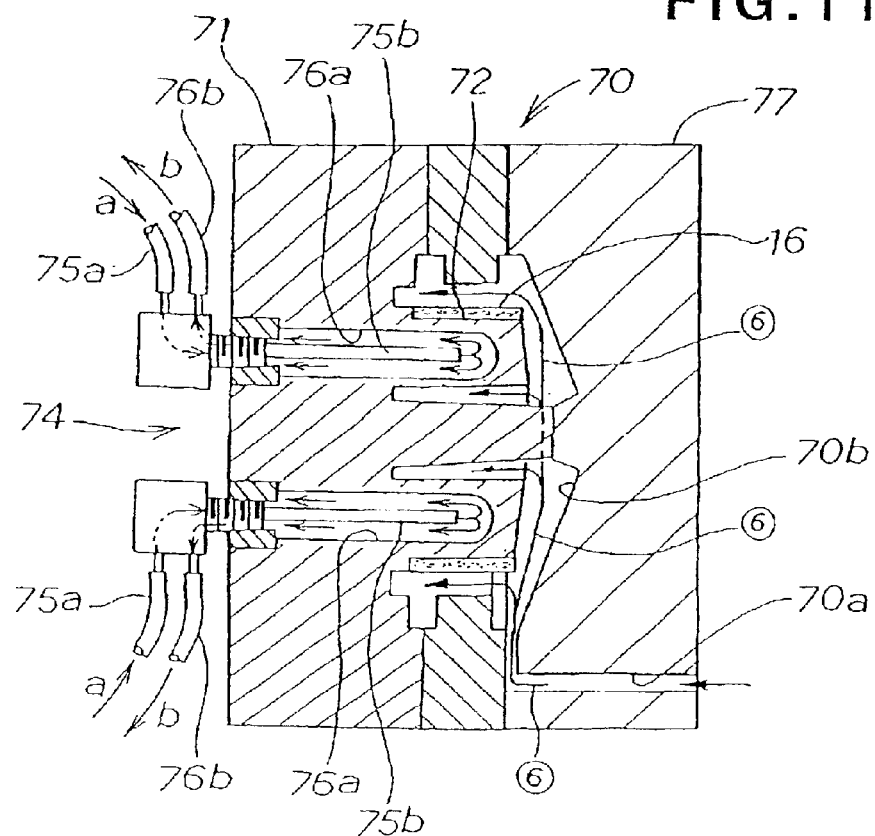
FIGS. 11A and 11B are sectional views explanatory of how molten metal is charged into a cavity of the casting mold to produce the brake drum of the present invention.
Figure 11B:
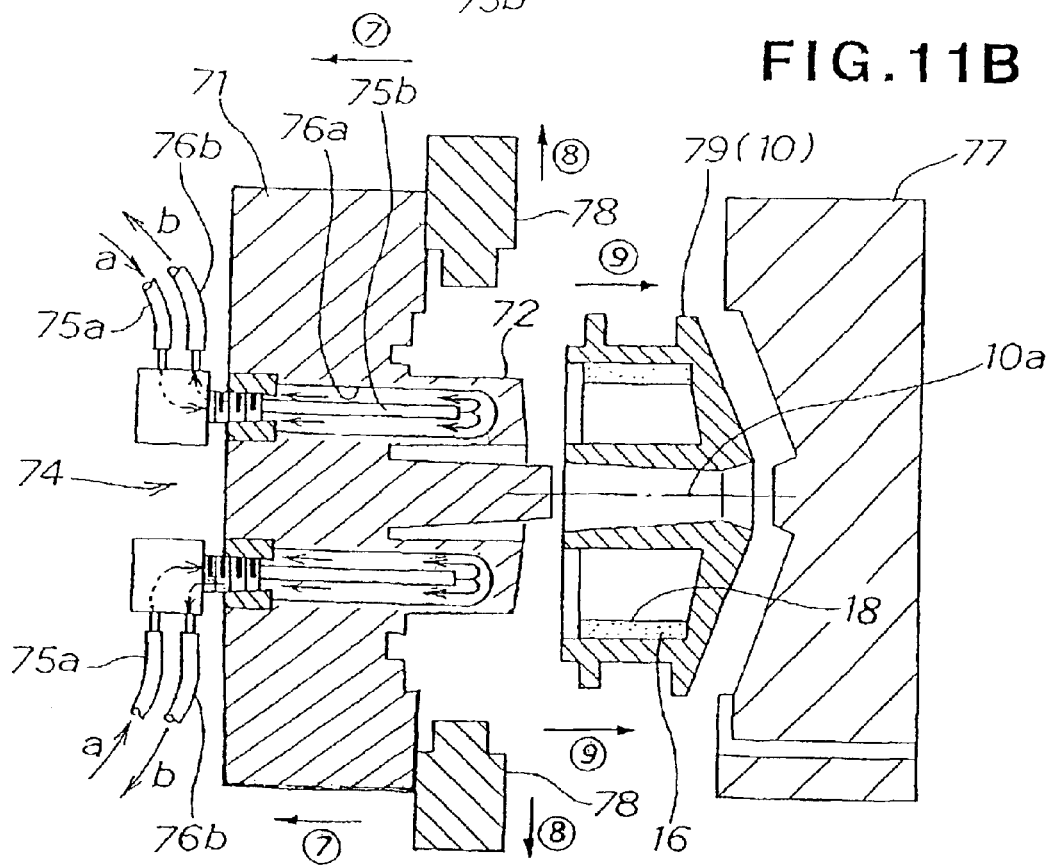

Next, as shown in FIG. 11A, the casting mold 70 is closed or clamped, and then the molten metal of the Al alloy is charged, through a sprue 70a of the fixed mold member 77, into a mold cavity 70b as denoted by arrow ⑥, so as to cast-envelop the friction member 16 by the Al alloy. The Al alloy thus cast-enveloping the friction member 16 constitutes the hub 15 shown in FIG. 1.

Because the molten metal of the Al alloy has a high temperature of about 680° C., the friction member 16 and movable-mold protruding portion 72 are together heated by the molten metal charged into the mold cavity 70b, so that it is likely that a relatively great clearance is produced between the friction member 16 and the movable-mold protruding portion 72. However, the cooling water circulated via the cooling section 74 through the interior of the movable-mold protruding portion 72, the temperature of the friction member 16 and movable-mold protruding portion 72 can be effectively prevented from increasing excessively.

Then, after the molten Al alloy is solidified, the movable mold member 71 is moved in a direction of arrow ⑦, and also sliding molding members 78 are moved away as denoted by arrow ⑧. After that, a casting or cast product 79 is removed from the movable mold member 71 as denoted by arrow ⑨.

Because the friction member 16 can be closely fitted on the movable-mold protruding portion 72 as previously stated, it can be cast-enveloped coaxially with the axial line 10a of the brake drum 10. Further, the instant embodiment can prevent the Al alloy from adhering to the inner circumferential surface 18 of the friction member 16, or can minimize the amount of the Al alloy adherence to the inner circumferential surface 18. If necessary, the inner circumferential surface of the friction member 16 in the casting 79 may be ground to a desired size, to thereby provide the finished brake drum 10 of FIG. 1.

Figure 12:
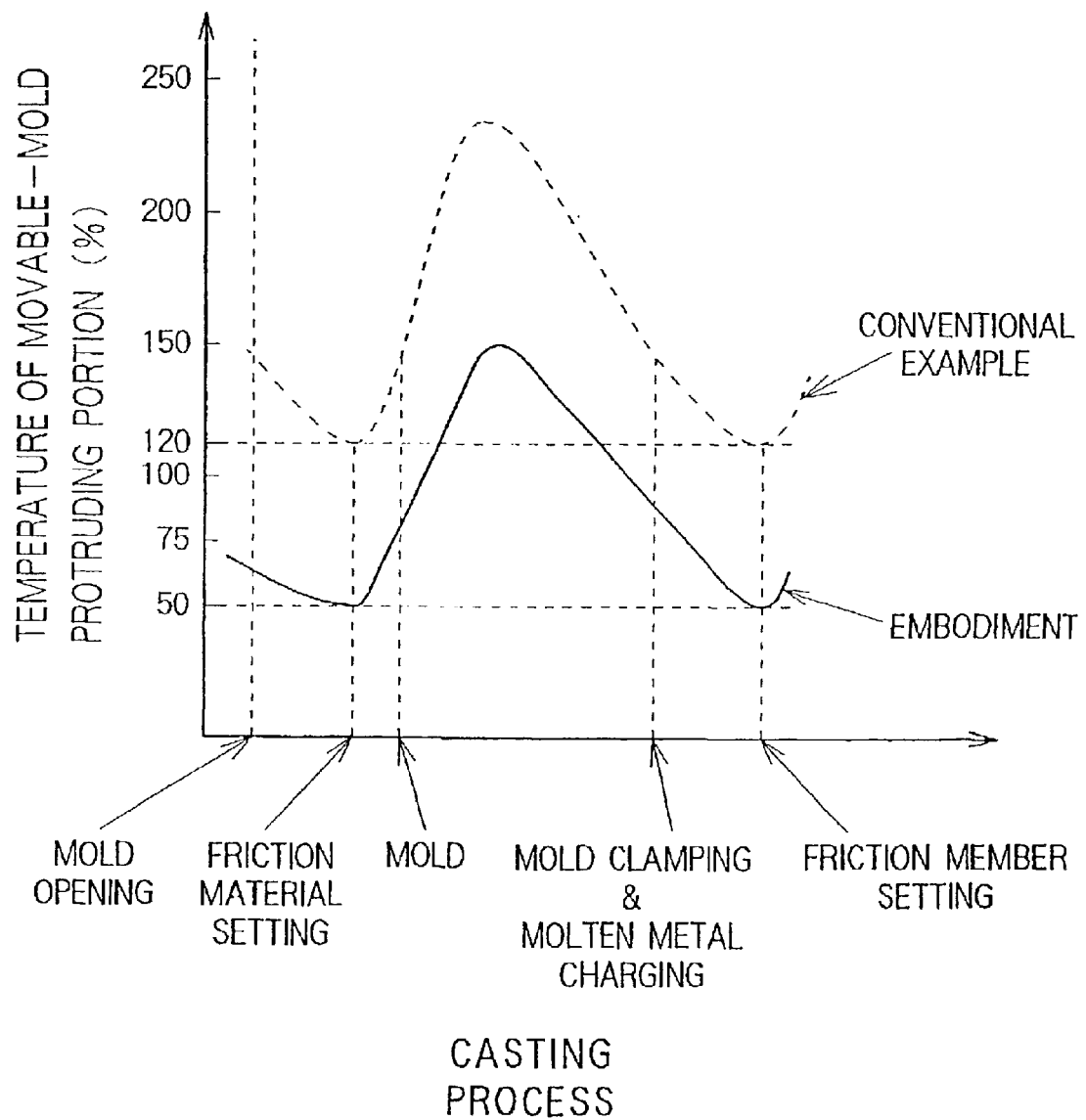
FIG. 12 is a graph explanatory of a brake-drum casting process in accordance with the present invention.

FIG. 12 is a graph explanatory of a brake-drum casting process in accordance with the present invention, where the horizontal axis represents several casting steps while the vertical axis represents the temperature of the movable-mold protruding portion 72. In the graph of FIG. 12, a solid line represents the instant embodiment of the present invention having the cooling section 74 as described above, while a dotted line represents an example of the conventional brake drum having no such cooling section 74.

In the conventional example, the temperature of the movable-mold protruding portion 72 when the friction member 16 is about to be fitted to the outer periphery of the protruding portion 72 is 120° C. Because the temperature of the movable-mold protruding portion 72 is as high as 120° C., the friction member 16 has to be heated to a temperature higher than 120° C. in order to form a relatively great clearance between the movable-mold protruding portion 72 and the friction member 16. Heating the friction member 16 to such a high temperature would increase the cost of the heating facilities.

With the heated friction member 16 fitted on the outer periphery of the movable-mold protruding portion 72, the temperature of the movable-mold protruding portion 72 increases above 120° C. Then, after the casting mold 70 is closed, the molten metal (about 680° C.) is charged into the mold 70 under this condition, so that he friction member 16 is also heated up to about 230° C., which would result in a relatively great gap between the friction member 16 and the movable-mold protruding portion 72. Thus, the friction member 16 may be easily displaced relative to the movable-mold protruding portion 72 during the charging of the molten metal, which would make it difficult to cast-envelop the friction member 16 coaxially with the movable-mold protruding portion 72.

In the instant embodiment, on the other hand, the temperature of the movable-mold protruding portion 72 when the friction member 16 is about to be fitted to the outer periphery of the protruding portion 72 is only 50° C. Because the temperature of the movable-mold protruding portion 72 is as low as 50° C., it is only necessary that the friction member 16 be heated up to 100° C. Thus reducing the necessary temperature of the friction member 16 can effectively prevent an increase in the cost of the heating facilities.

Then, after the casting mold 70 is closed, the molten metal (about 680° C.) is charged into the mold 70 under this condition, during which time the cooling water is circulated via the cooling section 74 through the interior of the movable-mold protruding portion 72 so that the temperature of the friction member 16 and movable-mold protruding portion 72 can be limited below about 150° C. As a consequence, the clearance between the friction member 16 and the movable-mold protruding portion 72 can be restricted to substantially the same size range as shown in FIG. 10. Thus, it is possible to cast-envelop the friction member 16 coaxially with the movable-mold protruding portion 72 while preventing the molten metal from entering between the movable-mold protruding portion 72 and the friction member 16.

Figure 13:
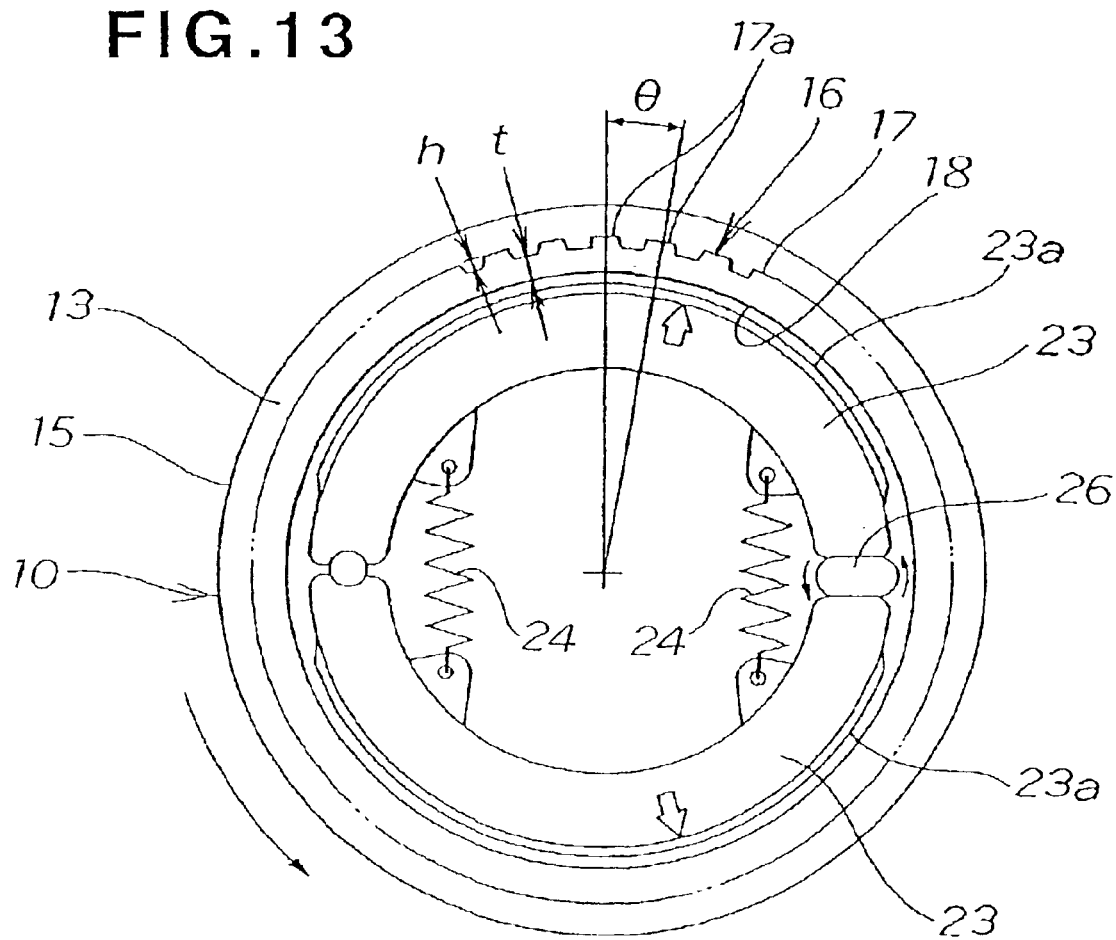
FIG. 13 is a schematic diagram showing a drum brake apparatus provided with the brake drum in accordance with the present invention.

FIG. 13 shows the drum brake apparatus equipped with the brake drum in accordance with the present invention. As the motorcycle moves forward, the brake drum 10 mounted on the motorcycle rotates in a counterclockwise direction as denoted by arrow. When a cam 26 is turned in an arrowed direction under this condition, the paired brake shoes 23 are moved apart from each other radially outwardly against the bias of the tension springs 24. This way, respective pads 23a of the brake shoes 23 are tightly pressed against the inner circumferential surface 18 of the friction member 16, so that the brake drum 10 is caused to stop rotating.

At that time, rotational force is still being transmitted from the vehicle to the hub 15, which would cause the drum body 13 to keep on rotating separately from the friction member 16. This is why the friction member 16 of the invention has a plurality of projecting portions 17a formed on its outer periphery 17 at regular pitch angles 0 in such a manner that the outer periphery 17 has alternating projecting and depressed portions. The friction member 16 is tightly fastened to the drum body 13 with the protrusions and depressions on the outer periphery 17 placed in meshing engagement with the inner circumferential surface of the drum body 13, so that even when a great circumferential load acts on the friction member 16, the friction member 16 can be reliably prevented from being not only circumferentially displaced relative to the drum body 13 but also detached from the drum body 13.

The above-mentioned pitch angle θ between the projecting portions 17a are set to be in the range of 6–45, more preferably in the range of 6–30°. Although it is preferable that the height h of each of the projecting portions 17a be set to be relatively small, e.g. in the range of 0.5–3 mm, as compared to the thickness t of the friction member 16, the height h may vary depending on the size of the brake drum without being necessarily limited to the 0.5–3 mm range alone.

Figure 14A:
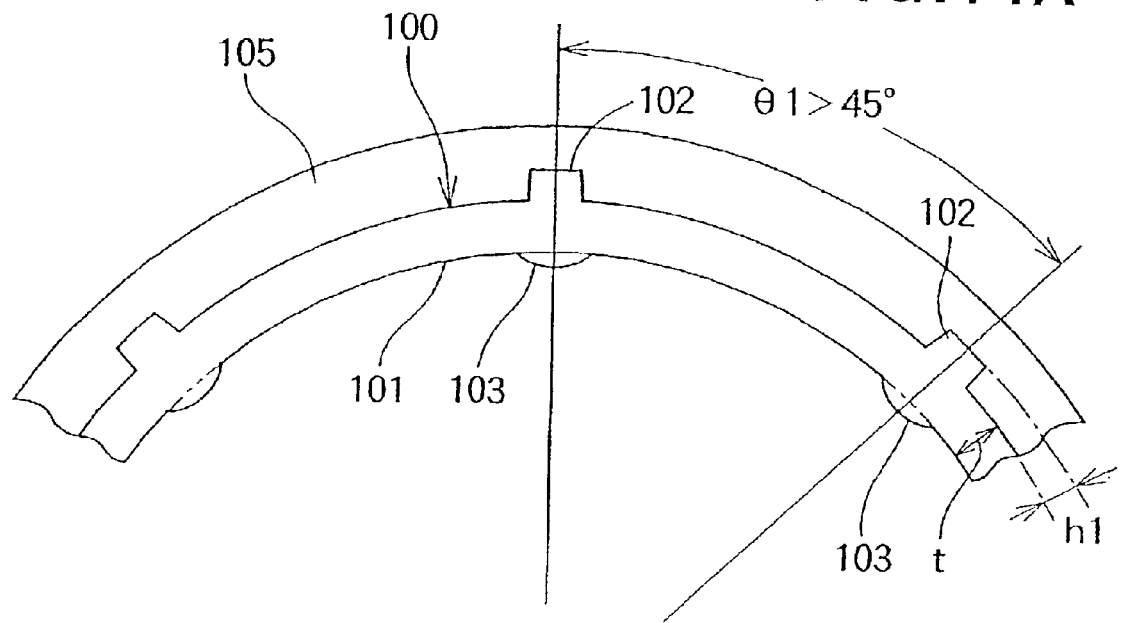
FIGS. 14A and 14B are enlarged fragmentary views of the brake drum shown in FIG. 13.
Figure 14B:
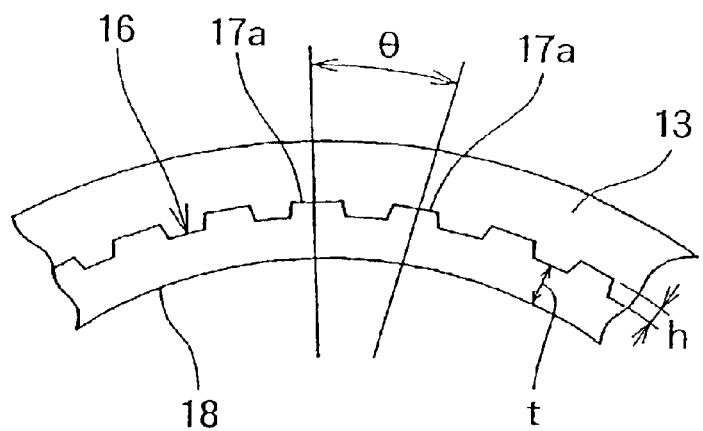

FIGS. 14A and 14B are diagrams explanatory of thermal expansion of the friction member; more specifically, FIG. 14A shows the thermal expansion of the friction member in the conventional brake drum, while FIG. 14B shows the thermal expansion of the friction member in the embodiment of the present invention.

In FIG. 14A, when frictional heat is produced by pressing brake shoe pads against the inner circumferential surface of the friction member 100, the temperature of the friction member 100 would increase up to about 400° C. Since the thus-produced frictional heat is not instantly conveyed to the drum body 105, the friction member 100 would thermally expands due to the frictional heat.

As seen from the illustrated conventional brake drum, setting the height h1 of each of the projecting portions 102 of the friction member 100 to a great value (to be more specific, three mm or over) would cause the projecting portions 102 to thermally expand greatly. Due to this, portions of the inner circumferential surface 101 of the friction member 100, opposite from the outer projecting portions 102, each expand inwardly to form a thermally expanded portion 103. Likewise, if the intervals between the projecting portions 102 are increased in such a manner that the pitch angles θ1 between the projecting portions 102 each exceed 45°, the projecting portions 102 are excessively spaced from each other so that the thermal expansion in and around the projecting portions 102 can not dissipate widely, and thus the portions of the inner circumferential surface 101 of the friction member 100, opposite from the outer projecting portions 102, expand inwardly to form thermally expanded portions 103. As a result, the brake shoe pads can no longer be pressed enough to closely contact uniformly against the inner circumferential surface 101 of the friction member 100.

In the embodiment of the present invention shown in FIG. 14B, on the other hand, the height h of each of the projecting portions 17a on the friction member 16 is set to a small value preferably in the range of 0.5–3 mm, the entire radial thickness of the friction member 16 in each of the regions where the projecting portions 17a are formed is reduced as compared to that in the conventional brake drum, and the thermal expansion is restricted accordingly. Further, if the pitch angle θ between the projecting portions 17a is set to the 6–45° range, preferably to the 6–30° range, every adjoining projecting portions 17a will be located closer to each other so that the inner circumferential surface 18 of the friction member 16 is allowed to thermally expand substantially uniformly. As a result, the brake shoes 23 can be pressed uniformly against the inner circumferential surface 18 of the friction member 16.

Note that even where the pitch angle θ between the projecting portions 17a is in the range of 30–45°, the thermal expansion produced in the portions of the inner circumferential surface 18 of the friction member 16 opposite from the projecting portions 17a can fall within an allowable range.

Where the pitch angle θ between the projecting portions 17a is greater than 45°, every adjoining projecting portions 17a are excessively spaced apart from each other, i.e. the number of the projecting portions 17a decreases considerably (six projecting portions 17a or less to provide uniform intervals therebetween), which is not preferable because the biding force between the drum body 13 and the friction member 16 is reduced.

Further, where the pitch angle θ between the projecting portions 17a is 6° or less, every adjoining projecting portions 17a are located too close to each other, which means that each of the depressed portions between the projecting portions 17a on the outer periphery has an excessively small width. Thus, each of the protrusions of the drum body 13 meshingly engaging the depressed portions of the friction member 16 also has a reduced width, which would result in an insufficient strength of the protrusions of the drum body 13 and consequently it is likely that the friction member 16 will be detached from the drum body 13 as the brake shoes are pressed against the friction member 16.

In order to provide good solutions to the above-mentioned inconveniences, the pitch angle θ between the projecting portions 17a in the present invention is set to the range of 6–45° in such a manner that a sufficient number of the projection 17a are provided with each of the projections 17a having more than a predetermined strength and the biding force between the drum body 13 and the friction member 16 is significantly increased.

Further, where the height h of each of the projecting portions 17a is smaller than 0.05 mm, the amount of the meshing engagement, i.e. biding force, between the friction member 16 and the drum body 13 becomes too small, and consequently it is likely that the friction member 16 will be detached from the drum body 13 as the brake shoes are pressed against the friction member 16.

Further, where the height h of each of the projecting portions 17a is greater than 3 mm, there would be undesirably produced thermally expanded portions on the inner circumferential portions 18 of the frictional member 16 as the frictional member 16 expands thermally, as in the conventional brake drum.

In order to provide good solutions to the above-mentioned inconveniences, the height h of the projecting portions 17a of the friction member 16 in the present invention is set to the range of 0.5–3 mm.

Whereas the embodiment of the invention has been described above in relation to the case where alumina 32 is used as the metal-oxide-based reinforcing material, metal oxide-group ceramics, rather than the alumina 32, may be used as the metal-oxide-based reinforcing material.

Further, whereas the embodiment of the invention has been described above in relation to the case where the friction member 16 is used in motorcycle brake drums, the friction member 16 of the invention may be applied to automobile brake drums other than the motorcycle brake drums.

Industrial Applicability

In the present invention, the outer drum body formed of an Al alloy and the inner friction member formed of an Al-base composite material are each based on the Al alloy, the inventive brake drum can be significantly reduced in weight as a whole. Further, because the friction member has projecting and depressed portions formed on its outer periphery and the outer periphery of the friction member is cast-enveloped by the Al alloy, the friction member and the drum body can be firmly fastened together so that the friction member can be reliably prevented from being undesirably detached from the drum body. Therefore, the inventive brake drum can be advantageously applied to drum brake apparatus of motorcycles or automobiles.

What is claimed is:

1. A method for producing a brake drum by fastening a friction member to an inner circumferential surface of a backup member formed of an Al alloy, said method comprising:

a step of providing an annular friction member formed of an Al-base composite material;

a step of heating said friction member;

a step of fitting said friction member, heated by said step of heating, on a protruding portion of one of mold members of a casting mold which has a lower temperature than said friction member;

a step of forming a cavity by mating the one mold member with another mold member of the casting mold; and a step of charging molten metal of the Al alloy into the cavity while compulsorily cooling said heated friction member, to thereby cast-envelop said friction member.

2. A method as claimed in claim 1 wherein compulsory cooling, in said step of charging, of said heated friction member is performed by circulating a cooling liquid in the protruding portion of the one mold member.

3. A method as claimed in claim 1 wherein said annular friction member of the Al-base composite material is produced by:

a step of producing the Al-base composite material by causing a reinforcing material of metal nitride to contact magnesium nitride and causing the Al alloy to penetrate into the reinforcing material with at least part of the reinforcing material exposed as a metal part through reducing action of the magnesium nitride; and a step of forming, by extrusion, the Al-base composite material into a cylindrical member having projecting and depressed portions on an outer periphery thereof, an inner diameter of said cylindrical member constituting an inner diameter of said brake drum; and a step of cutting said cylindrical member into a width corresponding to said brake drum.

4. A method for producing a brake drum by fastening a friction member to an inner circumferential surface of a backup member formed of an Al alloy, said method comprising:

a step of producing an Al-base composite material by causing a reinforcing material of metal nitride to contact magnesium nitride and causing the Al alloy to penetrate into the reinforcing material with at least part of the reinforcing material exposed as a metal part through reducing action of the magnesium nitride; and a step of forming, by extrusion, the Al-base composite material into a cylindrical member having projecting and depressed portions on an outer periphery thereof, an inner diameter of said cylindrical member constituting an inner diameter of said brake drum;

a step of cutting said cylindrical member into a width corresponding to said brake drum, to thereby provide said friction member; and a step of setting said friction member in a casting mold and cast-enveloping the set friction member by the Al alloy functioning as said backup member.

5. A method as claimed in claim 4 which further comprising a step of, after provision of said friction member, heating said friction member above a temperature of said casting mold, and wherein after the heated friction member is set in said casting mold, said friction member is cast-enveloped by the Al alloy.

6. A method as claimed in claim 4 wherein said step of forming, by extrusion, the Al-base composite material is performed with an extrusion ratio set to a range of 10 to 40, where said extrusion ratio is a value determined by dividing a cross-sectional area of the Al-base composite material before the extrusion by a cross-sectional area of the cylindrical member after the extrusion.

* * * * *

UNITED STATES PATENT AND TRADEMARK OFFICE
CERTIFICATE OF CORRECTION

PATENT NO. : 6,880,681 B2  Page 1 of 1
DATED : April 19, 2005
INVENTOR(S) : Koizumi et al.

It is certified that error appears in the above-identified patent and that said Letters Patent is hereby corrected as shown below:

<u>Title page,</u>
Item [30], Foreign Application Priority Data, insert
-- May 29, 2000 (JP) 2000-158725 --

Signed and Sealed this

Ninth Day of August, 2005

JON W. DUDAS
*Director of the United States Patent and Trademark Office*